United States Patent [19]
Holmes et al.

[11] 4,022,499
[45] May 10, 1977

[54] TUBE RETAINING COMPRESSION FITTING

[75] Inventors: Paul M. Holmes; Charles F. Crissy, both of Jackson; Douglas M. Brant, Grand Rapids, all of Mich.

[73] Assignee: Aeroquip Corporation, Jackson, Mich.

[22] Filed: Apr. 14, 1975

[21] Appl. No.: 567,591

[52] U.S. Cl. .................... 285/328; 285/340; 285/382.7; 285/341
[51] Int. Cl.² .................................. F16L 25/00
[58] Field of Search ....... 285/328, 340, 319, 382.7, 285/403, 330, 321, 342, 341, 343

[56] References Cited

UNITED STATES PATENTS

| | | | |
|---|---|---|---|
| 1,512,298 | 10/1924 | Mueller | 285/330 |
| 2,330,841 | 10/1943 | Parker | 285/328 |
| 2,986,409 | 5/1961 | Weber | 285/342 |

FOREIGN PATENTS OR APPLICATIONS

| | | | |
|---|---|---|---|
| 1,335,121 | 7/1963 | France | 285/340 |

Primary Examiner—Andrew V. Kundrat
Attorney, Agent, or Firm—Beaman & Beaman

[57] ABSTRACT

A compression fitting for use with tubular conduits wherein the fitting includes means for retaining the desired positioning of the conduit or tube within the fitting prior to completion of the making of the joint by the tightening of the compression nut. The tube retaining means disclosed take the form of two embodiments. One of the tube retainers is in the form of gripping means which engage the tube when initially inserted into the fitting to prevent partial axial withdrawal of the tube prior to completion of the joint. Spring biased edges embed into the tube exterior surface preventing inadvertent axial displacement of the tube prior to axial forces being imposed upon the tube during completion of the joint. The second type of tube retention utilizes a plurality of serrations engaging the end of the tube which embed into the tube end and retain the tube against rotation relative to the fitting during tightening of the compression nut.

8 Claims, 6 Drawing Figures

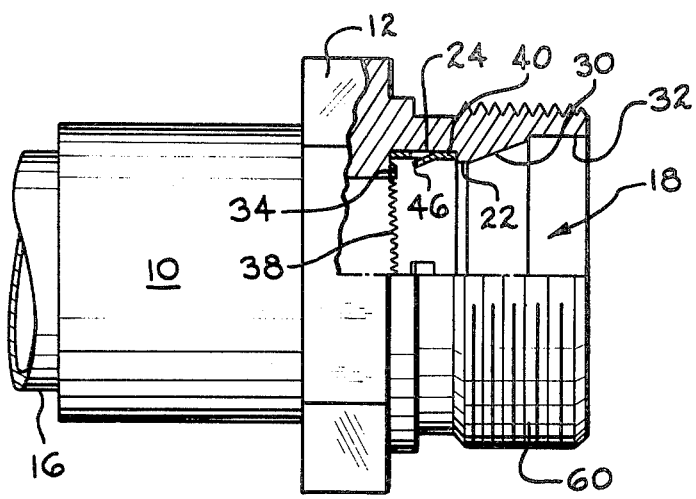
FIG. 1
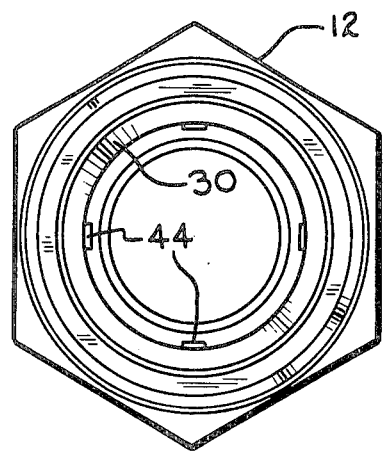
FIG. 2
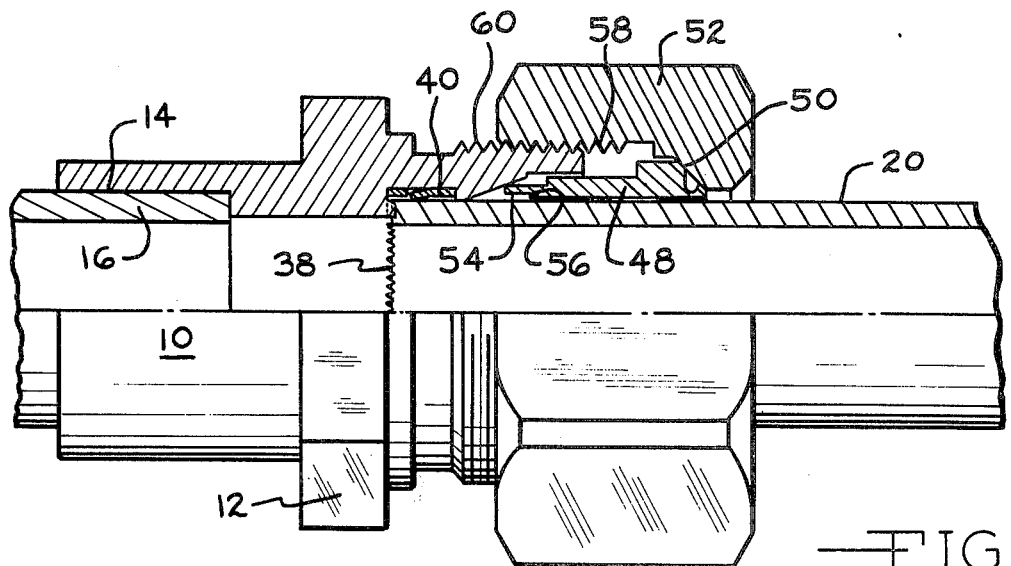
FIG. 3
FIG. 5
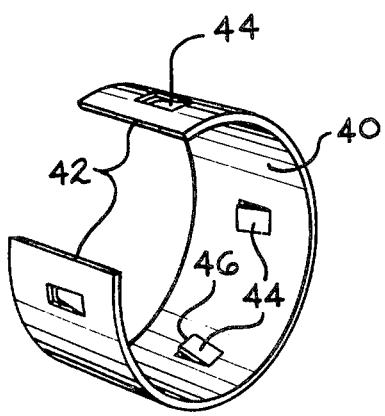
FIG. 4
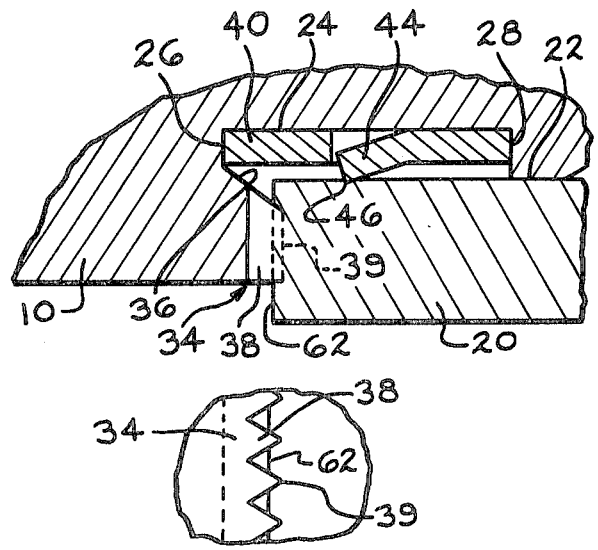
FIG. 6

TUBE RETAINING COMPRESSION FITTING

BACKGROUND OF THE INVENTION

The invention pertains to compression fittings utilizing compression nuts and axial displaceable ferrules or bushings.

The usual compression fitting construction includes an annular recess into which the tube to be connected is bottomed, a ferrule or bushing receiving surface is defined adjacent the tube recess, and a compression nut encircling the tube axially compresses the ferrule into the fitting recess to cause a radial compression of the ferrule which establishes a completed sealed mechanical connection between the tube and fitting.

Compression fittings are widely used in the plumbing arts, and in the use of this type of fitting it is standard practice to investigate to insure that the tube is "bottomed" in the fitting recess during rotation of the compression nut. The dimensional relationships of most compression fittings are so designed that proper sealing and operation occurs when the tube bottoms against the tube receiving recess defined therein, and it is important that the tube end be maintained against the recess receiving shoulder in order to prevent the end of the tube from collapsing due to the radial forces imposed thereon by the ferrule or bushing, and this relationship is further important to assure proper interrelationship between the ferrule, the tube and the ferrule engaging fitting surfaces.

It is not uncommon, particularly where access and visibility of the compression fitting is hindered, for the operator to attempt to interconnect a compression fitting and tube when the tube has become partially withdrawn from the fitting recess as the operator will not be aware of such condition. Accordingly, difficulty in producing an effective compression fitting seal is often experienced when the connection has been made under adverse conditions.

Another problem often encountered in the utilization of compression fittings results from rotation of the tube relative to the fitting as the compression nut is rotated to force the ferrule into a sealed relationship with the tube. Ideally, during assembly of a compression fitting, only the compression nut rotates relative to the fitting body, and the tube and ferrule are nonrotative. However, because of frictional factors, burrs, foreign matter, or for other reasons, it is not uncommon for the ferrule or bushing to rotate with the compression nut, imparting a rotative torque on the tube. This tendency for the tube to rotate, with the ferrule, will often result in an improper seal between the ferrule and the tube resulting in a leaking joint. While the operator may grasp the tube to retain the same against rotation such manual operation becomes difficult in many instances because of clearance problems, and the applying of a wrench or pliers to the tube damage.

SUMMARY OF THE INVENTION

It is a primary object of the invention to provide a compression fitting for use with a tube wherein the fitting incorporates features for retaining the tube with respect to the fitting before and during completion of the joint.

A purpose of the invention i to provide a compression fitting having retaining means for axially retaining a tube inserted into the fitting to the desired depth from withdrawing from the fitting prior to complete tightening of the compression nut. To this end an annular tube retaining member formed of spring steel is incorporated in the fitting having sharp edges which embed into the tube to resist axial tube withdrawal from the fitting. The sharp edges are defined upon spring tabs which radially deflect away from the tube when the tube is inserted into the fitting, and do not adversely affect initial assembly of the tube and fitting. However, the angular orientation of the spring tabs to the tube cause the tab edges to embed into the tube material when there is any tendency for the tube to be withdrawn from the fitting.

Further, the tube is retained against relative rotative movement to the fitting by the utilization of serrated teeth or edges defined in the fitting which embed into the end of the tube during tightening of the compression nut and seating of the ferrule preventing rotation of the tube and assuring an efficient seal between the tube and the fitting.

In accord with the invention the retaining means for preventing axial withdrawal of the tube from the fitting, and the means for preventing rotation of the tube with respect to the fitting, may be economically manufactured, and assembled with respect to the fitting and do not require major modifications of typical compression fitting congfigurations.

BRIEF DESCRIPTION OF THE DRAWINGS

The aforementioned objects and advantages of the invention will be appreciated from the drawings wherein:

FIG. 1 is an elevational view of a fitting in accord with the invention, partly in section, before insertion of a tube and assembly with a nut and ferrule, FIG. 2 is an elevational end view of the fitting of FIG. 1 as taken from the right, FIG. 3 is an elevational assembly view, partially in section, of a compression fitting in accord with the invention illustrating the assembly of components prior to beginning compression of the ferrule, FIG. 4 is a perspective view of the tube retainer, per se, FIG. 5 is an enlarged detail view of the fitting tube recess shoulder and tube retainer, and, FIG. 6 is an enlarged detail view of the tube receiving recess shoulder in elevation to illustrate the serrated teeth.

DESCRIPTION OF THE PREFERRED EMBODIMENT

A compression fitting in accord with the invention may have a configuration as will be apparent from FIGS. 1 through 3. The fitting body 10 is of an annular configuration having a hexagonal wrench receiving flange 12, and a recess 14 receiving a tube or conduit 16, which may be soldered or mechanically sealed within the recess. The fitting also includes an open outer end having a recess 18 defined therein concentric to the fitting axis and of a diameter sufficient to receive the tube 20 to be connected to the fitting by the compression structure thereof.

The minimum diameter of the tube receiving recess 18 is defined by the cylindrical edge 22, and inwardly, to the left of this edge as viewed in FIGS. 1 and 3, is defined a cylindrical tube retainer receiving notch 24 axially located by radial shoulders 26 and 28. The fitting is provided with a conical surface 30 outwardly of the edge 22 which merges into the cylindrical surface 32, and these two surfaces together define the ferrule receiving recess which accomodates the ferrule during tightening of the compression nut.

The fitting tube receiving recess 18 is axially defined by radially extending shoulder 34, best shown in FIG. 5. The shoulder 34 includes a recessed portion 36 extending to shoulder 26, and a plurality of axially extending serrations or teeth 38, FIG. 6, are formed on the shoulder, such as by a broaching or upsetting operation. As apparent in FIGS. 5 and 6, the sharp edges 39 of the teeth extend in a radial direction.

The tube retainer or gripper 40 is of an annular sleeve-like configuration, FIG. 4, which is axially split at 42, and is of a greater normal diameter than the notch 24. The retainer includes a plurality of projections in the form of spring tabs 44, four in the illustrated embodiment, lanced from the retainer periphery as to extend inwardly at approximately 15°. The retainer 40 is preferably formed of cold rolled spring steel, blue tempered, and the inwardmost edge 46 of the tabs 44, FIG. 5, define a sharp right angle, capable of embedding into the material of the tube 20. Usually, the tube 20 is of a relatively soft material, such as of copper, or copper alloy.

An annular ferrule or bushing 48 is utilized to establish the seal between the tube 20 and the body 10, and this type of ferrule is well known in the art. In the disclosed embodiment, the ferrule includes a bearing surface 50 which engages the actuating shoulder of the compression nut 52, and the "forward" end of the ferrule includes an axially extending annular projection 54, and an annular forwardly facing shoulder 56. The radial thickness of the ferrule 48 is such as to be received within the annular void between the exterior surface of the tube 20 and the fitting surface 32, as apparent in FIG. 3 prior to rotation of the compression nut.

The compression nut 52 is of an exterior hexagonal configuration provided with interior threads 58 which cooperate with the threads 60 exteriorly defined on the body 10. As will be appreciated from the drawing, the radial wall thickness of the tube 20 is such that the shoulder 34 is in substantial alignment with the tube wall thickness.

In use, the retainer 40 is located within the notch 24 and maintained therein by the normal tendency of the retainer to radially "open". As the axial length of the retainer 40 is only slightly less than the axial length of the notch 24 as defined by shoulders 26 and 28, axial movment of the retainer relative to the fitting body is prevented.

The compression fitting nut 52 is slipped over the end of the tube 20, as is the ferrule 48, and the tube 20 is inserted into the body recess 18 as far as possible until the tube end 62 firmly engages against the serration edges 39. As the tube end is inserted into the retainer 40, the spring tabs 44 will be engaged, and biased radially outwardly by the entering tube end. Thereupon, the edges 46 thereof will press against the exterior of the tube surface.

At this time, even though the nut 52 has not been threaded upon the body threads 60, the tube 20 may not be displaced axially outwardly with respect to the tube recess 18 because of the engagement of the tab edges 46 with the tube, and any tendency for axial displacement of the tube to the right, will cause the tab edges to embed into the tube material and resist such movement. Thus, once the tube 20 has been bottomed against the shoulder serration edges 39 the operator knows that the tube cannot become partially disassembled from the fitting body.

The operator then slides the ferrule 48 into the position shown in FIG. 3, and initially threads the compression nut 52 upon the body 10, FIG. 3. As the compression nut is tightened the ferrule 48 is pushed to the left, FIG. 3, into engagement with the conical surface 30, which biases the ferrule portion 54 radially inwardly causing the ferrule shoulder 56 to "bite" into the tube surface and establish a seal therewith.

During rotation of the compression nut 52 the ferrule will sometimes rotate with the compression nut on the tube 20, and this rotative force is, to some extent, transferred to the tube 20 during tightening of the compression nut. However, in the practice of the invention, as the ferrule 48 is pushed against surface 30, and as the ferrule bites into the tube and imposes an axial force on the tube 20 to the left, FIG. 3, this axial force will cause the end 62 of the tube to embed slighty into the shoulder serration edges 39, FIGS. 5 and 6, and this engagement between the serrations and tube end will prevent rotation of the tube relative to the fitting body 10 since the edges 39 are radial. Of course, the seal between the tube 20 and the fitting occurs at the ferrule 48, and thus the presence of the serrations 38 causes no sealing problems with respect to the completed joint. The nut 52 is threaded upon the body 10 until the desired degree of engagement between the ferrule and the fitting end tube is accomplished.

Of course, once the ferrule 48 begins to engage the tube 20 and force the tube toward the shoulder 34, the function of the retaining spring tabs 44 is no longer required. However, the retainer tabs 44 remain in engagement with the tube adjacent its end, as in FIG. 3, and the location of the retainer 40 in no way adversely affects the seal between the tube and compression fitting.

It is to be appreciated that while the disclosed embodiment of the compression fitting utilizes both the retainer 40 and the tube rotation retaining serrations 38, that both tube retaining means need not be utilized in a single compression fitting. For instance, the retainer 40 may be used without the serrations 38, and the serrations may be utilized without the retainer 40. In such instance, minor revisions to the configuration of the recess shoulder 34 may be made. For instance, if the serrations 38 are not utilized the shoulder 34 may be of a simple right angle radial configuration, and if the retainer 40 is not be utilized, it is not necessary that the notch 24 be formed.

Various other modifications to the inventive concepts may be apparent to those skilled in the art without departing from the spirit and scope of the invention.

We claim:

1. In a compression fitting including a hollow body having an axis, an open end and a passage defined therein intersecting said end, a tube receiving recess defined in said body concentric to said passage intersecting said end for receiving a tube to be connected to said body, said recess being axially defined by a shoulder facing said open end, a ferrule engaging surface defined on said body within said recess, a ferrule within said recess in radial alignment with said surface and ferrule compression means mounted upon said body engaging said body, the improvement comprising tube retainer means axially located in said recess between said recess shoulder and ferrule having at least one tube engaging member extending toward said axis for engaging and axially retaining a tube inserted into said recess prior to compression of said ferrule by said ferrule compression means, said tube retainer means comprising an annular sleeve having a wall of thin radial wall thickness defined in said tube receiving recess adjacent said shoulder having a plurality of biased tube engaging projections circumferentaily spaced on said sleeve wall, said projections comprising tabs lanced from said sleeve wall having a first end deflected from the configuration of said sleeve wall and a free second end defining an edge adapted to embed within a tube upon attempted axial removal of a tube from said recess, said tabs extending in an axial direction and said free end being disposed toward said shoulder.

2. In a compression fitting as in claim 1 wherein said sleeve wall is axially split, a cylindrical notch defined in said recess defined by axially spaced shoulders receiving said sleeve, said notch having a diameter less than the normal diameter of said sleeve, said sleeve being formed of resilient metal whereby the resiliency thereof maintains said sleeve within said notch.

3. In a compression fitting having a passage, a tube rceiving recess defined in the passage for receiving a tube, a ferrule encircling the tube and a compression nut threaded on the fitting engaging the ferrule for displacing the ferrule into engagement with the tube to form a sealed connection therewith, the improvement comprising a radial shoulder defining an inner end of the tube receiving recess engaged by the tube, tube rotation retaining means defined upon said shoulder adapted to embed into a tube end during tightening of said compression nut to prevent rotation of the tube comprising a plurality of axially extending serrations each having a sharp edge radially disposed to said tube receiving recess, and resiliently biased tube gripping means within the tube receiving recess adjacent said shoulder gripping a tube inserted into tube receiving recess and preventing axial displacement of the tube from said recess prior to tightening of said compression nut.

4. In a compression fitting as in claim 3 wherein said tube gripping means comprises a plurality of resilient projections extending into the tube receiving recess each having an edge which embeds into a tube upon attempted axial displacement of the tube from said tube receiving recess.

5. In a compression fitting as in claim 3 wherein said tube gripping means includes a cylindrical notch concentrically defined in the tube receiving recess adjacent said shoulder and axially defined by radial shoulders, an axially split spring steel sleeve of normal diameter than said notch circumferentially compressed within said notch and having an axial length slightly less than the axial spacing between said notch radial shoulders, and a plurality of projections lanced from said sleeve each extending into said tube receiving recess and each having an edge adapted to embed into a tube within said recess and prevent withdrawal thereof from said tube receiving recess.

6. In a compression fitting as in claim 5 wherein said projections each have a first end deflected from the material of said sleeve and a free second end defining said tube embedding edge, said projections axially extending toward said shoulder.

7. In a compression fitting including a hollow body having an axis, an open end and a passage defined therein intersecting said end, a tube receiving recess defined in said body concentric to said passage intersecting said end for receiving a tube to be connected to said body, said recess being axially defined by a shoulder facing said open end, a ferrule engaging surface defined on said body within said recess, a ferrule within said recess in radial alignment with said surface and ferrule compression means mounted upon said body engaging said body, the improvement comprising tube retainer means axially located in said recess between said recess shoulder and ferrule comprising at least one resilient projection mounted on said retainer means having an end resiliently biased radially inward toward said axis engaging and preventing axial displacement of a tube inserted into said recess prior to compression of said ferrule by said ferrule compression means.

8. In a compression fitting as in claim 7 wherein said projection end includes a sharp edge inclined with respect to said axis toward said shoulder whereby insertion of a tube within said recess engages said edge and biases said projection radially outwardly and axial movement withdrawing a tube from said recess causes said edge to embed in the tube and retain the tube within said recess.

* * * * *

UNITED STATES PATENT OFFICE
CERTIFICATE OF CORRECTION

Patent No. 4,022,499          Dated May 10, 1977

Inventor(s) Paul M. Holmes, Charles F. Crissy & Douglas M. Brant

It is certified that error appears in the above-identified patent and that said Letters Patent are hereby corrected as shown below:

Column 5, line 25, delete "rceiving" and insert -- receiving --

Column 6, line 7, after "normal" insert -- greater --

Signed and Sealed this twelfth Day of July 1977

[SEAL]

Attest:

RUTH C. MASON
*Attesting Officer*

C. MARSHALL DANN
*Commissioner of Patents and Trademarks*